April 27, 1937. F. H. SODEN 2,078,589
EYEGLASS CONSTRUCTION
Filed April 3, 1935

INVENTOR
Fred H. Soden
Harold E. Stonebraker
ATTORNEY

Patented Apr. 27, 1937

2,078,589

UNITED STATES PATENT OFFICE 2,078,589

EYEGLASS CONSTRUCTION

Fred H. Soden, Rochester, N. Y., assignor to Continental Optical Company, Inc., Rochester, N. Y., a corporation of Indiana Application April 3, 1935, Serial No. 14,525

5 Claims. (Cl. 88—43)

This invention relates to an eyeglass construction, with particular reference to the type of structure including a bridge of thin spring material capable of flexing in a plane transverse to the lenses, or generally in a horizontal direction, and has for its object to so construct and secure such a bridge to the lenses as to prevent flexing the bridge in the plane of the lenses or generally in a vertical direction, and to prevent any twisting of the bridge and consequent loosening and sagging of the lenses.

A bridge that will flex horizontally, or transverse to the plane of the lenses, is highly desirable in an eyeglass mounting so as to accommodate itself without breaking, or loosening any of the parts, to the removal of the glasses from or positioning them on the nose of the wearer, but flexible bridges have been inefficient and impractical because they have been connected with the lenses in such a manner as to readily cause vertical bending of the bridge, loosening of the lenses, and consequent lens sag.

This is a result that is serious and undesirable, because if the lenses are thrown out of alinement by even slight sagging, they are not positioned in the manner intended, and will consequently blur the vision or be otherwise harmful to the eyes, and it is a particular purpose of this invention to eliminate this condition, so that the lenses are not likely to be out of proper focus with the eyes, and vertical flexing of the bridge is substantially avoided, while at the same time the bridge and lenses are susceptible of sufficient flexing in a horizontal plane to permit the ordinary positioning and removal of the eyeglasses without in any way affecting their efficiency or utility.

To these and other ends, the invention consists in the combination and arrangement of parts that will appear from the following description when read in conjunction with the accompanying drawing, the novel features being pointed out in the claims following the specification.

Figure 1:
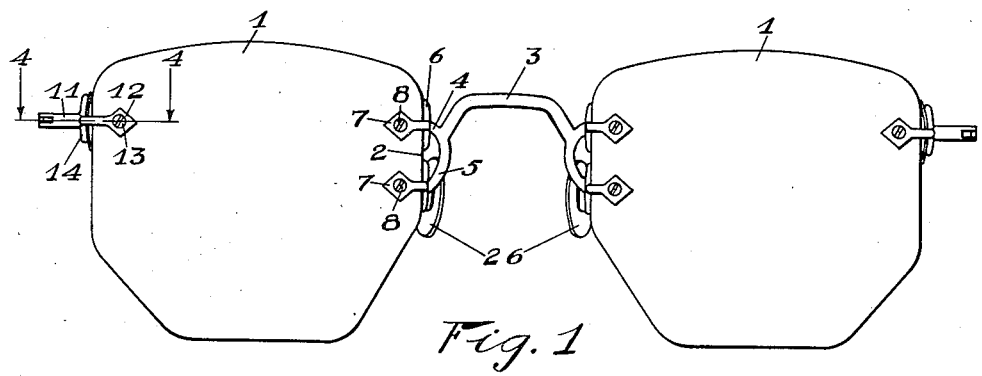
Fig. 1 is a view in front elevation of an eyeglass construction made in accordance with one embodiment of the invention.

Referring more particularly to the drawing, in which like reference numerals refer to the same parts throughout the several views, 1 designates a pair of lenses preferably provided with parallel straight end edges 2, to which the bridge assembly is attached in the manner that will now be described.

The bridge, designated at 3, is constructed of thin spring steel or other suitable spring material, the width and stiffness of which prevent its flexing vertically, or in the plane of the lenses, while its thin and springlike character permits ready flexing horizontally, or in a plane transverse to the lenses. The bridge 3 is provided with upper arms 4 and lower arms 5, each of which carries a lens edge-engaging portion 6 engaging the straight edge 2, and ears 7 extending on opposite surfaces of the lens and attached thereto by the screw 8. The lens edge-engaging portions 6 are arranged substantially at right angles to the edges 2 and ears 7, which extend over the lenses centrally from the edge-engaging portion 6. The ears 7, carried by the lower arms 5, are approximately in line with the longitudinal axes of the lenses, whereas the ears 7 carried by the upper arms 4 are somewhat above said longitudinal axes and approximately in line with, or slightly beneath, the bridge 3.

With this arrangement, an extremely rigid connection between the lenses and bridge is afforded, and by eliminating a long vertical leverage between the point of attachment with the lens and the bridge, twisting of the latter is effectually prevented and any tendency of the bridge otherwise to flex vertically, or in the plane of the lenses, is overcome. The lenses are consequently held rigidly in their proper relationship to the bridge, and sagging of the lenses which so frequently otherwise results is effectually prevented.

Figure 4:
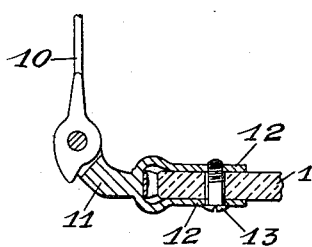
Fig. 4 is a horizontal sectional view on the line 4—4 of Fig. 1.
Figure 5:
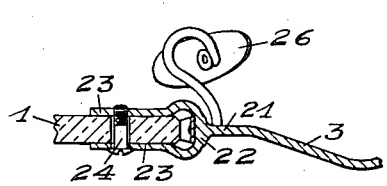
Fig. 5 is a horizontal sectional view on the line 5—5 of Fig. 3.

The temple 10, shown in Fig. 4, is pivotally connected to an end piece 11 which carries ears 12 engaging the opposite faces of the lens and held thereto by means of the screw 13, while 14 is a lens edge-engaging portion extending above and below the ears 12 in substantially right angular relationship thereto.

Figure 2:
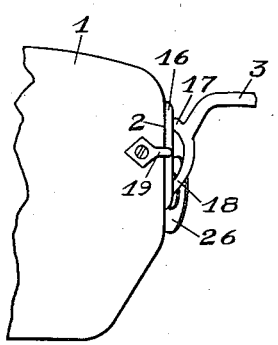
Fig. 2 is a front elevation, with parts broken away, of a modified arrangement in which a single lens edge-engaging portion and a single pair of ears are carried by both the upper and lower arms of the bridge.

In Fig. 2 is illustrated a modified arrangement of the construction, in which instead of employing two sets of ears above and below and two lens edge-engaging portions, there is one elongated lens edge-engaging portion as designated at 16, connected to and carried by the upper and lower arms 17 and 18 of the bridge, while 19 designates the ears carried by the lens edge-engaging portion 16 intermediate the ends thereof and extending at right angles thereto on opposite sides of the lens. It will be understood that the bridge 3 in this construction, as well as in the modification later to be described, is of thin spring material as in the structure illustrated in Fig. 1, and in the Fig. 2 arrangement, the lower ends of the lens edge-engaging portions 16 are approximately in line with the longitudinal axes of the lenses while the upper ends of the lens edge-engaging portion are in line with or slightly beneath the bridge 3, and the attaching ears are intermediate the upper and lower ends of the lens edge-engaging portion 16.

Figure 3:
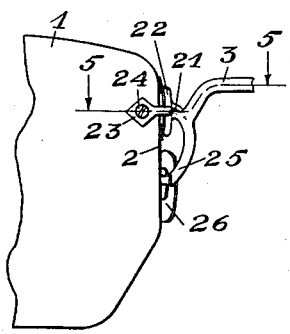
Fig. 3 is a front elevation with parts broken away of a further modification, in which the lens edge-engaging portion and lens engaging ears are carried by the upper arm of the bridge.

In the modification shown in Fig. 3, the upper arm 21 of the bridge is provided with a lens edge-engaging portion 22 extending above and below the same, while 23 designates the ears extending substantially at right angles to the lens edge-engaging portion 22, and secured by screws 24 on opposite faces of the lens. The arms 25 extend downwardly from the bridge and at their lower ends carry the nose pads 26, the lower ends of the arms 25 being approximately in line with the longitudinal axes of the lenses, while the points of attachment of the ears 23 to the lenses are above said longitudinal axes and substantially in line with or slightly beneath the bridge 3. This avoids any tendency of the bridge 3 to twist, or flex vertically, and also prevents loosening or sagging of the lenses while at the same time permitting the bridge to readily flex horizontally.

While the invention has been described with reference to certain particular embodiments, it is not confined to the details shown and described, and this application is intended to cover any changes or modifications coming within the purposes of the invention or the scope of the following claims.

I claim:

1. In an eyeglass construction, the combination with a pair of lenses having parallel straight edges at their ends, temples attached to the outer ends of the lenses at points adjacent to the upper edges thereof, a bridge of thin spring material constructed and arranged to flex only in a plane transverse to the lenses and including a horizontal portion and downwardly and outwardly extending portions located substantially in the plane of the lenses and terminating close to and in the plane of the lenses, of arms integrally and rigidly connected to the ends of said downwardly extending portions of the bridge and extending directly therefrom horizontally to the lenses, lens edge-engaging portions carried by said arms and engaging the edges of the lenses, and ears carried by said arms extending at right angles to the edge-engaging portions and engaging opposite surfaces of the lenses, said ears being attached to the lenses at points in line with the ends of said downwardly extending portions of the bridge, the said lens edge-engaging portions extending above and below said ears and said ears and lens edge-engaging portions being disposed adjacent to the upper edges of the lenses with the upper ends of the edge-engaging portions in line with the horizontal portion of the bridge, whereby movement of the lenses relatively to the bridge in the plane of the lenses is prevented and twisting of the ears relatively to the lenses is also prevented.

2. In an eyeglass construction, the combination with a pair of lenses having parallel straight edges at their ends, temples attached to the outer ends of the lenses at points adjacent to the upper edges thereof, a bridge of thin spring material constructed and arranged to flex only in a plane transverse to the lenses and including a horizontal portion and downwardly and outwardly extending portions located substantially in the plane of the lenses and terminating close to and in the plane of the lenses, of arms integrally and rigidly connected to the ends of said downwardly extending portions of the bridge and extending directly therefrom horizontally to the upper portions of the edges of the lenses, lens edge-engaging portions carried by said arms and engaging the edges of the lenses, and ears carried by said arms and extending from a point intermediate the ends of the lens edge-engaging portions and at right angles thereto, said ears being attached to the lenses at points in line with the ends of said downwardly extending portions of the bridge and slightly beneath the horizontal portion of the bridge, the upper ends of the edge-engaging portions being in line with the horizontal portion of the bridge, whereby movement of the lenses relatively to the bridge in the plane of the lenses is prevented and twisting of the ears is also prevented.

3. In an eyeglass construction, the combination with a pair of lenses having parallel straight edges at their ends, temples attached to the outer ends of the lenses, a bridge of thin spring material adapted to flex in a plane transverse to the lenses and including a horizontal portion and downwardly extending portions, of upper and lower arms integrally and rigidly connected to the ends of said downwardly extending portions of the bridge, lens edge-engaging portions carried by said upper and lower arms and adapted to engage said straight edges of the lenses, and ears carried by said upper and lower arms and extending at right angles to said edge-engaging portions and adapted to engage opposite surfaces of the lenses, said lower ears being approximately in line with the longitudinal axes of the lenses and said upper ears being disposed adjacent to the upper edges of the lenses, whereby movement of the lenses relatively to the bridge in the plane of the lenses is prevented.

4. In an eyeglass construction, the combination with a pair of lenses having parallel straight edges at their ends, temples attached to the outer ends of the lenses, a bridge of thin spring material constructed and arranged to flex only in a plane transverse to the lenses and including a horizontal portion and downwardly and outwardly extending portions located substantially in the plane of the lenses and terminating close to and in the plane of the lenses, of upper and lower arms integrally and rigidly connected to the ends of said downwardly extending portions of the bridge, lens edge-engaging portions connecting said upper and lower arms and engageable with the adjacent edges of the lenses, and ears carried by said lens edge-engaging portions intermediate their ends and at right angles thereto and engageable on opposite surfaces of the lenses, the lower ends of said lens edge-engaging portions being approximately in line with the longitudinal axes of the lenses and the upper ends thereof being adjacent to the upper edges of the lenses, whereby movement of the lenses relatively to the bridge in the plane of the lenses is prevented.

5. In an eyeglass construction, the combination with a pair of lenses having parallel straight edges at their ends, temples attached to the outer ends of the lenses at points adjacent to the upper edges thereof, a bridge of thin spring material constructed and arranged to flex only in a plane transverse to the lenses and including a horizontal portion and downwardly and outwardly extending portions located substantially in the plane of the lenses and terminating close to and in the plane of the lenses, of upper arms integrally and rigidly connected to the lower ends of said downwardly extending portions of the bridge and extending directly therefrom horizontally to the lenses and provided with lens edge-engaging portions and ears extending at right angles thereto and engageable on opposite surfaces of the lenses, lower arms integrally and rigidly connected to the ends of said downwardly extending portions of the bridge, and nose pads mounted on said lower arms, the lower ends of said lower arms being approximately in line with the longitudinal axes of the lenses and the point of attachment of said ears with the lenses being adjacent to the upper edges of the lenses and slightly beneath the horizontal portion of the bridge, while the upper ends of the edge-engaging portions are in line with the horizontal portion of the bridge, whereby movement of the lenses relatively to the bridge in the plane of the lenses is prevented and twisting of the ears is prevented.

FRED H. SODEN.